(12) United States Patent
Selgert

(10) Patent No.: US 8,190,171 B2
(45) Date of Patent: May 29, 2012

(54) METHOD AND DEVICE FOR PROVIDING THE LOCATION OF A MOBILE STATION

(75) Inventor: Franklin Selgert, Berkel en Rodenrijs (NL)

(73) Assignee: Koninklijke KPN N.V., The Hague (NL)

( * ) Notice: Subject to any disclaimer, the term of this patent is extended or adjusted under 35 U.S.C. 154(b) by 913 days.

(21) Appl. No.: 12/086,838

(22) PCT Filed: Dec. 5, 2006

(86) PCT No.: PCT/EP2006/011644
§ 371 (c)(1),
(2), (4) Date: Jul. 17, 2008

(87) PCT Pub. No.: WO2007/071321
PCT Pub. Date: Jun. 28, 2007

(65) Prior Publication Data
US 2009/0082032 A1  Mar. 26, 2009

(30) Foreign Application Priority Data

Dec. 22, 2005  (EP) .................................... 05078023

(51) Int. Cl.
*H04W 24/00* (2009.01)

(52) U.S. Cl. ............... 455/456.1; 455/456.5; 455/456.6; 455/457; 455/404.1

(58) Field of Classification Search ....... 455/456.1–457, 455/404.2, 440, 411
See application file for complete search history.

(56) References Cited

U.S. PATENT DOCUMENTS

| 6,002,932 | A  | * | 12/1999 | Kingdon et al. | ............... 455/433 |
| 6,363,255 | B1 | * | 3/2002 | Kuwahara | .................. 455/456.5 |
| 2003/0157842 | A1 | | 8/2003 | Arnett et al. | |
| 2004/0104841 | A1 | | 6/2004 | Syrjarinne | |
| 2005/0012611 | A1 | * | 1/2005 | Osman | ..................... 340/539.13 |

FOREIGN PATENT DOCUMENTS

EP           1 139 688     10/2001
WO    WO 2004/047477      6/2004

* cited by examiner

*Primary Examiner* — Kamran Afshar
*Assistant Examiner* — Dung Lam

(57) ABSTRACT

The present invention provides a solution for providing the location of a mobile device connected to a first mobile network to a second mobile network. A mobile device receives information about the geographic location of the base stations in its neighborhood. Based on the identity of the base station the device is connected to the device can determine its geographic location and provide that to the second mobile network.

9 Claims, 1 Drawing Sheet

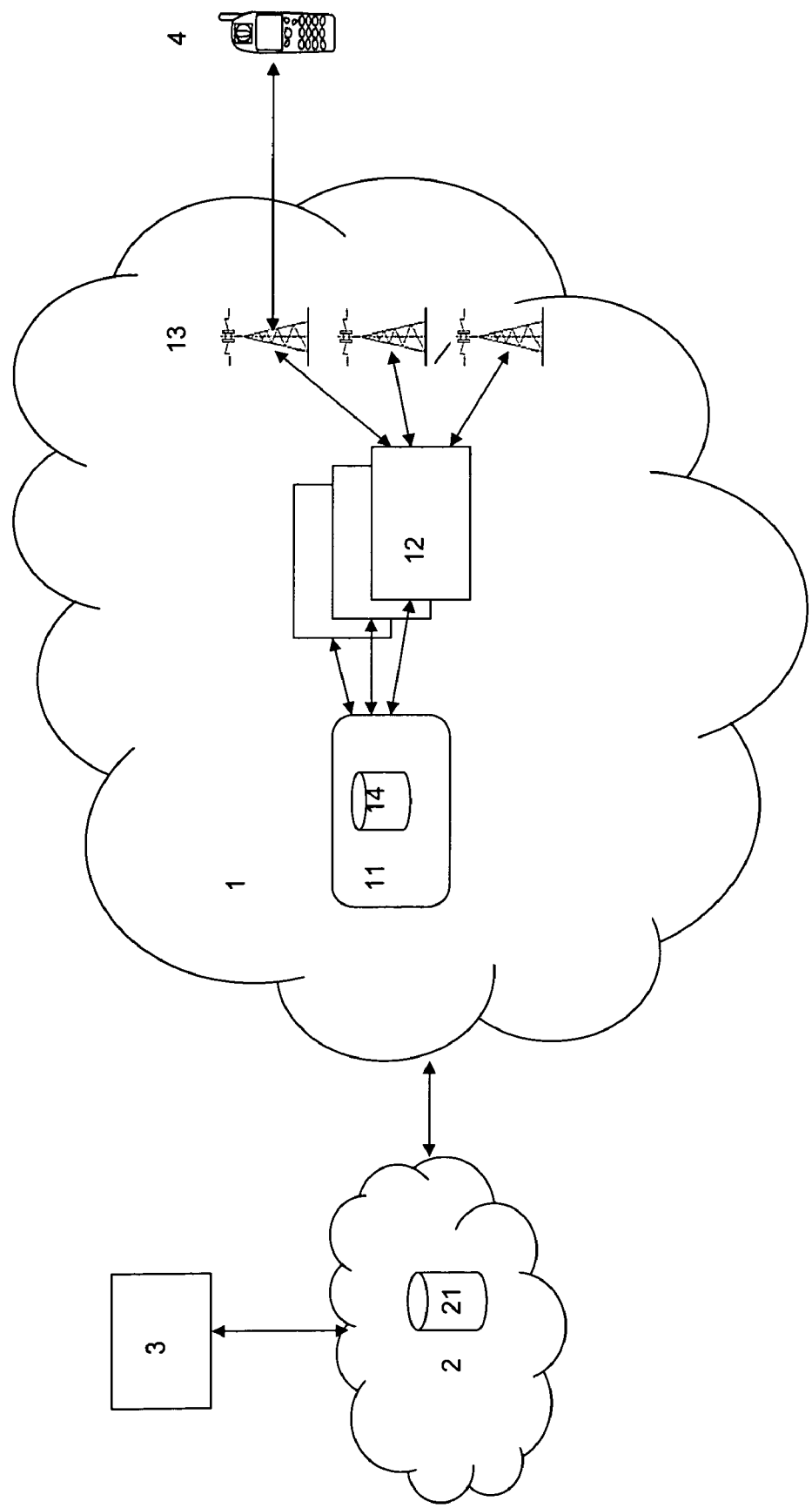

METHOD AND DEVICE FOR PROVIDING THE LOCATION OF A MOBILE STATION

BACKGROUND OF THE INVENTION

1. Field of the Invention

The present invention pertains to cellular communication systems and, more specifically, to providing the location of a mobile station in a cellular communication system.

2. Description of the Prior Art

Nowadays the use of wireless communication devices like for example mobile phones or personal digital assistants (PDA) is widespread. With the emergence of new technologies the use of these devices is not limited to voice applications.

Of the new types of services that is expected to be broadly accepted in the near future are services providing enhanced functionality to the end user of a mobile device based on the location of the user of the mobile device, so called Location Based Services (LBS). Services that can be provided if the location of the device is known are e.g., directing the user of the device to a specific destination, providing the local weather forecast or providing information with regard to the nearest relevant shop or point of interest.

Depending on the type of service to be provided different methods of determining the location of a device can be applied. Some services require a very accurate location; other services like the local weather forecast can function with a less accurate location. Well-known methods of determining the location of a device are based on the location of the base station of the radio cell the mobile device is connected to. The location of the base station is of course known to the operator of the network to which those base stations belong. Those methods of determining the location of the mobile device based on the location of the base station the device is connected to, function correctly as long as the mobile device is connected to its home network. The identity of the relevant base station is known from the standard signaling traffic in the network and the location, for instance expressed in x-y coordinates, can be retrieved from a database and provided to the service provider as the location of the mobile device. However, as soon as the mobile device is connected to a base station of another network, the problem arises that based on the Cell-ID (which is always disclosed to the home network of the subscriber, to enable the mobile device to function in the visited network) the location of the relevant base station can only be derived based on the Cell-ID if the location information of all base stations of the visited is available to the operator of the home network. For a variety of reasons operators are reluctant to disclose the exact location of their network's base stations. Another problem is the maintenance of the database; base stations might be added to the networks. Therefore location-provisioning methods based on the location of the base station do not provide interoperability between different network providers. Therefore there is a need for a method of providing the location of a mobile device without publicly disclosing the location of all the base stations of a network.

The prior art fails to disclose a method and system for providing the location of a mobile station based on Cell-ID in a secure and simple manner between different networks.

SUMMARY OF THE INVENTION

The present invention provides a solution for providing the location of a mobile device connected to a cellular network to another network.

In particular, the present invention aims to provide a system and method for providing the location of a mobile station in a secure and simple manner, without publicly disclosing the location of all the base stations of the cellular network.

According to one aspect of the invention a method for providing the location of a mobile device in a first cellular communication network to a second cellular communication network, based on the location of the base station of said first network to which said mobile device is currently connected. The method can comprise the following steps or a subset of the following steps: the first network provides location information of at least one of the base stations of its network to the mobile device; the first network also provides the identity of the base station to which the mobile device is currently connected to the mobile device; the mobile device determines the location of the base station to which it is currently connected; the mobile device provides the location information of the base station to which it is connected to the second network. This is advantageous because the second network does not need to maintain information with regard to the location of all base stations of the first network. The mobile device can e.g., be a mobile telephone, a PDA, but also a laptop with communication means. The cellular network can be a network according to presently known standards like e.g., GSM, GPRS, UMTS, WiFi, but also any other known or new type of cellular network. The location information of at least one of the base station of the first network can, in case the cellular network is a GSM network, for example contain information about all the Base Transceiver Stations, BTS, of one Base Station Controller, BSC, when the mobile device enters the area covered by this BSC. The BTS and the elements in the BSC controlling this particular BTS are collectively called a "base station". The method can further comprise the steps of: the first network encrypting the location information of at least one base station of its network prior to providing the location information of at least one base station to the mobile device; the mobile device providing the encrypted location information of the base station to which said mobile device is currently connected to the second network; the first network providing the information necessary to decrypt said encrypted location information to said second network; the second network decrypting the encrypted location information of the base station to which the mobile device is currently connected. This has the advantage that the location of the base station is not publicly disclosed and remains a secret between the first and the second network. The first and the second network operators need to agree on the provision of the encryption key. The operators might agree on a payment for the encryption key. Several known methods of encryption can be used for the purposes of the invention. Encryption of the location information and agreements about the provisioning of the encryption-decryption key and method to be used, can also be combined with encryption for other purposes, e.g., for Digital Rights Management. The location information about at least one of the base stations of the first network that is provided to the mobile device is updated regularly while the mobile device is moving within the first network. This has the advantage that only a small amount of data has to be kept in the mobile device. The location information with regard to at least one of the base stations of said first network that is send to the mobile device can for instance comprise of a table or database comprising the Cell-ID of the BTS's in a BSC area and the x, y coordinates indicating the location of the BTS's. It can additionally comprise the value of the Timing Advance (TA) or the Observed Time Difference (OTD). Both values enhancing the accuracy of the location information. Preferably the location information of the base station to which the mobile device is connected is provided to the second network in the standard update location procedure. This has the advantage that standard signaling messages can be used, and the adaptations, and hence investments, are limited. However other known methods of sending the location information to the second network, like SMS or OTA are also possible. The invention can also be applied when the subscriber is in his own network.

According to a second aspect of the invention a mobile device is disclosed for providing its location in a first cellular communication network to a second cellular communication network, based on the location of the base station of the first network to which the mobile device is currently connected. The device can comprise: means for receiving and storing location information with regard to at least one of the base stations of the first network; means for receiving from the first network the identity of the base station to which the mobile device is currently connected; means for determining the location of the base station to which the mobile device is currently connected; means for providing location information of the base station to which the mobile device is connected to said second network. The location information with regard to at least one of the base stations of the first network provided is updated regularly while the device is moving within the first network. The location information with regard to at least one of the base stations of the first network can comprise the Cell-ID of the base station and the x, y coordinates indicating said location. The location information of the base station to which said device is connected can also comprise the value of the Timing Advance (TA) or the Observed Time Difference (OTD).

BRIEF DESCRIPTION OF THE DRAWINGS

The invention will be explained in greater detail by reference to exemplary embodiments shown in the drawing, in which:

FIG. 1 schematically shows an exemplary network architecture in which the method and device according to the invention can be implemented.

DETAILED DESCRIPTION OF THE INVENTION

For the purpose of teaching of the invention, preferred embodiments of the method and system f the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

The exemplary network architecture of FIG. 1 comprises a first network (1) from a first network operator, a second network (2) from a second operator, a service provider (3) end one or more mobile devices (4) from subscribers of the second network (1) but connected to the first network (1). The service provider (3) can provide location-based services to mobile device (4). Therefore the service provider (3) requests from the second network (2) the location of mobile device (4). So the second network is the HPLMN of the mobile device (4), and the first network is the VPLMN.

The first and the second network (1, 2) are cellular networks, for the purpose of the teaching of the invention the networks (1, 2) in this exemplary embodiment are GSM networks. The networks comprise known network elements; the elements that are not relevant for the present invention are not depicted in FIG. 1. The relevant elements include a home location register, HLR (21), in the second network (2) that is actually a database comprising details of the subscribers of the second network (2), including the current location of the subscribers. The relevant elements of the first network (1) include one or more Mobile Switching Centers, MSC (11), connected to one or more base station controllers, BCS (12) that are connected to one or more base transceiver stations, BTS (13). The BTS provides the radio connection with one or more mobile devices (4) that are in the coverage area of the BTS (13). One BTS (13) and the elements in the BSC (12) controlling this particular BTS are collectively called a "base station". The MSC (11) comprises a Visitor Location Register, VLR (14), which is a database containing all relevant information with regard to all mobile devices connected to the coverage area of the MSC (11).

The first network (1) from a first operator is connected to the second network (2) from a second network operator. This connection facilitates e.g., that subscribers of the first network (1) can use the second network (2) and vice versa when they are out of reach of their own network. Networks are connected physically but the operators of the networks also have business agreements, so called roaming agreements, comprising details on how a customer of one network should be handled by the other network, and e.g., billing details. Usually one cellular network is connected to a number of other networks, both within the same country and in different countries.

According to the method and system of the present invention when a mobile device (4) that belongs to a subscriber of second network (2) enters the coverage area of a BSC (12) it receives from the network information with regard to the location of all the BTS' (13) within that area. This information might take the form of a small table or database comprising for all BTS' the unique identity of the radio cell covered by the BTS, the Cell-ID, and the x-y coordinates of the location of the BTS. This information can also comprise the Time Advance (TA), which is already known in the network and improves the accuracy of the location determination. Another parameter that can be comprised in this information is the Observed Time Difference (OTD), which also enhances the accuracy.

This information can be sent to the mobile device in several different ways, e.g., by SMS or by OTA message, but preferably as part of the normal signaling traffic between a MSC, BCS, BTS and a mobile device. This has the advantage that standardized signaling protocols are used, and the invention can be utilized without major adaptations of the normal flow of traffic. The information can be stored in the mobile device, e.g., on the SIM card, or in the internal memory of the mobile device. If the mobile device moves around and enters the coverage area of another BSC, the table is updated.

When the mobile device enters a new BTS area, his home network and more specifically his home network HLR needs some minimal information with regard to the location of the mobile device in order to ensure that calls to the mobile devices can be routed correctly. The mobile device has to provide this information, and does so in GSM networks by the standardized location update procedure. The information necessary to perform this location update is received from the VPLMN, including the identity (Cell-ID) of the BTS the mobile device is connected to.

Based on the Cell-ID the mobile device can consult the table or database he previously received from the network and look up the location of the BTS. Additionally the TA and OTD can be retrieved from the network. By adding the location information to the standard location update message to the home network, the home network now has access to the relevant location information, but a comprehensive list of all BTS locations of a network does not need to be publicly disclosed.

According to an advantageous embodiment of the present invention the information in the table or database comprising the location of all the BTS' is encrypted before it is sent to the mobile device.

The operator of the home network can only read the encrypted location information if he has the key necessary to decrypt the information. This key might be provided by the operator of the visited network as part of a roaming agreement, possibly including billing arrangements.

The information, whether encrypted or not, with regard to the location of the subscriber is always present in his home network, but will only be disclosed to a location based services provider if other criteria are met, e.g., with regard to the privacy of the subscriber. Solutions for safeguarding the privacy of the subscriber are known in the prior art.

Each network can handle the provisioning of the location of both its own subscribers and visiting subscribers in the same way.

The invention claimed is:

1. A method for providing the geographic location of a mobile device in a first cellular communication network to a second cellular communication network, based on the geographic location of the base station of said first network to which said mobile device is currently connected, comprising the steps of:
    said first network providing encrypted geographic location information with regard to at least one of the base stations of said first network to said mobile device;
    said first network providing the identity of the base station to which said mobile device is currently connected to said mobile device and information necessary to decrypt said encrypted geographic location information to said second network;
    said mobile device determining the geographic location of the base station to which said mobile device is currently connected;
    said mobile device providing said encrypted geographic location information of the base station to which said mobile device is connected to said second network, and said second network decrypting said encrypted geographic location information using said information necessary to decrypt.

2. The method according to claim 1 whereby said geographic location information with regard to at least one of the base stations of said first network provided to the mobile device is updated regularly while the mobile device is moving within said first network.

3. The method according to claim 1 whereby the geographic location information with regard to at least one of the base stations of said first network comprises the Cell-ID of the base station and the x,y coordinates indicating said geographic location.

4. The method according to claim 1 whereby the geographic location information of the base station to which said mobile device is connected also comprises the value of the Timing Advance (TA) or the Observed Time Difference (OTD).

5. The method according to claim 1 whereby the geographic location information of the base station to which said mobile device is connected is provided to the second network in a standard update location procedure.

6. A mobile device for providing its geographic location in a first cellular communication network to a second cellular communication network, said first network providing an encrypted geographic location of the base station of said first network to which said mobile device is currently connected and providing information necessary to decrypt said encrypted geographic information to said second network, the device comprising:
    means for receiving and storing said encrypted geographic location information with regard to at least one of the base stations of said first network;
    means for receiving from said first network the identity of the base station to which said mobile device is currently connected;
    means for determining the geographic location of the base station to which said mobile device is currently connected;
    means for providing said encrypted geographic location information of the base station to which said mobile device is connected to said second network.

7. The device according to claim 6 whereby said geographic location information with regard to at least one of the base stations of said first network provided is updated regularly while said device is moving within the first network.

8. The device according to claim 6 whereby the geographic location information with regard to at least one of the base stations of said first network comprises the Cell-ID of the base station and the x,y coordinates indicating said location.

9. The device according to claim 6 whereby the geographic location information of the base station to which said device is connected also comprises the value of the Timing Advance (TA) or the Observed Time Difference (OTD).

* * * * *